(12) United States Patent
Kondo (10) Patent No.: US 12,470,012 B2
(45) Date of Patent: Nov. 11, 2025

(54) CONNECTOR

(71) Applicant: SUMITOMO WIRING SYSTEMS, LTD., Mie (JP)

(72) Inventor: Tomoyuki Kondo, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 273 days.

(21) Appl. No.: 18/276,414

(22) PCT Filed: Feb. 25, 2022

(86) PCT No.: PCT/JP2022/007809
§ 371 (c)(1),
(2) Date: Aug. 8, 2023

(87) PCT Pub. No.: WO2022/181751
PCT Pub. Date: Sep. 1, 2022

(65) Prior Publication Data
US 2024/0128677 A1    Apr. 18, 2024

(30) Foreign Application Priority Data
Feb. 26, 2021   (JP) .................................. 2021-029808

(51) Int. Cl.
*H01R 13/42* (2006.01)
*H01R 4/36* (2006.01)
(Continued)

(52) U.S. Cl.
CPC ........... *H01R 13/5202* (2013.01); *H01R 4/36* (2013.01); *H01R 13/42* (2013.01); *H01R 13/502* (2013.01); *H01R 13/74* (2013.01)

(58) Field of Classification Search
None
See application file for complete search history.

(56) References Cited

U.S. PATENT DOCUMENTS 6,290,239 B1     9/2001  Yoshigi
7,306,475 B2 *  12/2007  Tsuruta .................... H01R 4/30
                                                        439/364
(Continued)

FOREIGN PATENT DOCUMENTS

JP        2000-040551 A      2/2000
JP        2017-045514 A      3/2017
(Continued)

OTHER PUBLICATIONS

International Search Report issued on Apr. 12, 2022 for WO 2022/181751 A1 (5 pages).

*Primary Examiner* — Tho D Ta
(74) *Attorney, Agent, or Firm* — Venjuris, P.C.

(57) ABSTRACT

A connector is provided which can be mounted on a case without bolt fastening. A connector (C) to be mounted on a case (100) is provided with a housing (10) to be passed through a mounting hole (101) formed in the case (100), a terminal fitting (40) held in the housing (10), an inner harness (60) to be connected to the terminal fitting (45) inside the case (100), and a C-ring (70) mounted on an outer peripheral surface of the housing (10). The outer peripheral surface of the housing (10) includes a flange (13) projecting toward an outer peripheral side and a C-ring mounting groove (14), into which the C-ring (70) is mounted. The flange (13) and the C-ring (70) sandwich a peripheral edge part of the mounting hole (101), out of the case (100).

8 Claims, 7 Drawing Sheets

(51) Int. Cl.
*H01R 13/502* (2006.01)
*H01R 13/52* (2006.01)
*H01R 13/74* (2006.01)

(56) References Cited

U.S. PATENT DOCUMENTS

| | | | |
|---|---|---|---|
| 10,381,773 B2 * | 8/2019 | Hashimoto | .......... H01R 43/005 |
| 2013/0028001 A1 | 1/2013 | Yokota | |
| 2013/0217262 A1 | 8/2013 | Ikeda et al. | |
| 2018/0287286 A1 | 10/2018 | Hashimoto | |
| 2021/0044057 A1 * | 2/2021 | Kondo | ................. H01R 13/405 |

FOREIGN PATENT DOCUMENTS

| | | | | |
|---|---|---|---|---|
| JP | 2017069116 A | * | 4/2017 | ......... H01R 13/5202 |
| JP | 2018-016295 A | | 2/2018 | |
| WO | 2018/123703 A1 | | 7/2018 | |

* cited by examiner

CONNECTOR

CROSS REFERENCE TO RELATED APPLICATIONS

This application is a national phase of PCT application No. PCT/JP2022/007809, filed on 25 Feb. 2022, which claims priority from Japanese patent application No. 2021-029808, filed on 26 Feb. 2021, all of which are incorporated herein by reference.

TECHNICAL FIELD

The present disclosure relates to a connector.

BACKGROUND

Conventionally, a connector to be mounted on a transmission case of a transmission or the like is known. For example, a connector described in Patent Document 1 below is provided with a mounting flange. The mounting flange is bolt-fastened to the transmission case.

PRIOR ART DOCUMENT

Patent Document

Patent Document 1: JP 2017-069116 A

SUMMARY OF THE INVENTION

Problems to be Solved

The connector as described above requires a hole for bolt fastening in the transmission case. However, the hole for bolt fastening may not be provided in the case due to the case side layout.

Accordingly, the present disclosure aims to provide a connector mountable on a case without bolt fastening.

Means to Solve the Problem

The present disclosure is directed to a connector to be mounted on a case, the connector including a housing to be passed through a mounting hole formed in the case, a terminal fitting held in the housing, an inner harness to be connected to the terminal fitting inside the case, and a C-ring mounted on an outer peripheral surface of the housing, the outer peripheral surface of the housing including a flange projecting toward an outer peripheral side and a C-ring mounting groove, the C-ring being mounted into the C-ring mounting groove, the flange and the C-ring sandwiching a peripheral edge part of the mounting hole, out of the case, the terminal fitting including an inner connecting portion to be connected to the inner harness and an outer connecting portion projecting outwardly of the case from the housing, a potting material being arranged on an outer terminal holding surface of the housing to cover the outer terminal holding surface, the outer connecting portion projecting from the outer terminal holding surface, the inner connecting portion including a fastening member for connecting the inner harness, an axis of the fastening member extending in a penetration direction of the housing through the mounting hole, and the inner harness being arranged to extend from the inner connecting portion in a direction intersecting the penetration direction.

Effect of the Invention

According to the present disclosure, it is possible to provide a connector mountable on a case without bolt fastening.

DETAILED DESCRIPTION TO EXECUTE THE INVENTION

Description of Embodiments of Present Disclosure

First, embodiments of the present disclosure are listed and described.

(1) The connector of the present disclosure is a connector to be mounted on a case and includes a housing to be passed through a mounting hole formed in the case, a terminal fitting held in the housing, an inner harness to be connected to the terminal fitting inside the case, and a C-ring mounted on an outer peripheral surface of the housing, the outer peripheral surface of the housing including a flange projecting toward an outer peripheral side and a C-ring mounting groove, the C-ring being mounted into the C-ring mounting groove, the flange and the C-ring sandwiching a peripheral edge part of the mounting hole, out of the case, the terminal fitting including an inner connecting portion to be connected to the inner harness and an outer connecting portion projecting outwardly of the case from the housing, a potting material being arranged on an outer terminal holding surface of the housing to cover the outer terminal holding surface, the outer connecting portion projecting from the outer terminal holding surface, the inner connecting portion including a fastening member for connecting the inner harness, an axis of the fastening member extending in a penetration direction of the housing through the mounting hole, and the inner harness being arranged to extend from the inner connecting portion in a direction intersecting the penetration direction. According to this configuration, since the housing can be held in the mounting hole by the flange and the C-ring, the connector can be mounted on the case without bolt fastening. Further, since the potting material is arranged on the outer terminal holding surface of the housing, from which the outer connecting portion projects, a liquid in the case can be prevented from leaking to the outside of the housing along a boundary between the terminal fitting and the housing. In addition, since the axis of the fastening member is the same direction as the penetration direction of the housing through the mounting hole, a space for a fastening operation is easily secured. Moreover, since the inner harness extends from the inner connecting portion in the direction intersecting the penetration direction of the housing through the mounting hole, the connector can be reduced in height as compared to the case where the inner harness extends in the penetration direction of the housing through the mounting hole.

(2) Preferably, the C-ring mounting groove is formed to extend in a circumferential direction in the outer peripheral surface of the housing and includes a first protrusion and a second protrusion at positions opposite to each other on the outer peripheral surface of the housing, a dimension in the circumferential direction of the first protrusion is smaller than that of the second protrusion, the C-ring includes a fitting portion to be fit to the first protrusion with the C-ring mounted in the C-ring mounting groove, and a dimension in the circumferential direction of the fitting portion is smaller than that of the second protrusion. According to this configuration, the C-ring can be mounted into the C-ring mounting groove only in such an orientation that the fitting portion is fit to the first protrusion. Therefore, an orientation of the C-ring can be set.

(3) An inner terminal holding surface of the housing, a plurality of the inner connecting portions projecting from the inner terminal holding surface, may include a first rib and a second rib, the first rib may be provided between the adjacent inner connecting portions, and the second rib may be provided at a position opposite to the first rib with respect to one of the adjacent inner connecting portions. According to this configuration, a short circuit between the adjacent inner connecting portions can be prevented by the first rib. Further, an extending direction of the inner harness can be limited to a predetermined range by the first and second ribs.

(4) The first rib may be located on a tip side in a rotation direction of the fastening member provided on the one of the adjacent inner connecting portions during fastening, and the second rib may be located on a tip side in a rotation direction of the fastening member provided on the other of the adjacent inner connecting portions during fastening. According to this configuration, the first rib functions as a rotation stopper in fastening the inner harness to the one inner connecting portion. The second rib functions as a rotation stopper in fastening the inner harness to the other inner connecting portion. Therefore, an operation of connecting the inner harnesses can be easily performed.

(5) The inner connecting portion may be formed with a through hole, and the fastening member may include a press-fit nut press-fit into the through hole and a bolt to be attached to the press-fit nut. According to this configuration, the inner harness can be connected to the inner connecting portion by bolt-fastening the inner harness to the press-fit nut.

(6) The housing may include an outer periphery projecting portion projecting from a part in a circumferential direction of the outer peripheral surface. According to this configuration, the connector can be fixed in a predetermined orientation to the case by bringing the outer periphery projecting portion into contact with a positioning portion provided on the case.

(7) The terminal fitting may be a busbar including the inner connecting portion, the outer connecting portion and a linking portion between the inner and outer connecting portions. According to this configuration, the connector can be easily manufactured since the terminal fitting can be embedded in the housing by insert molding.

(8) The housing may include a receptacle to be arranged outside the case and fittable to a mating connector, the outer terminal holding surface may be a back surface of the receptacle, a plurality of the outer connecting portions may be arranged at intervals on the outer terminal holding surface, and the linking portion may include a bent portion bent in an arrangement direction of the outer connecting portions. According to this configuration, the plurality of outer connecting portions can be so arranged that the interval therebetween is aligned with an interval between terminal fittings of a mating connector, and an interval between the linking portions can be made smaller than that between the outer connecting portions inside the housing. Therefore, an outer diameter of the housing can be reduced.

Details of Embodiment of Present Disclosure

A specific embodiment of a connector of the present disclosure is described below with reference to the drawings. Note that the present invention is not limited to these illustrations, but is represented by claims and intended to include all changes in the scope of claims and in the meaning and scope of equivalents.

Figure 1:
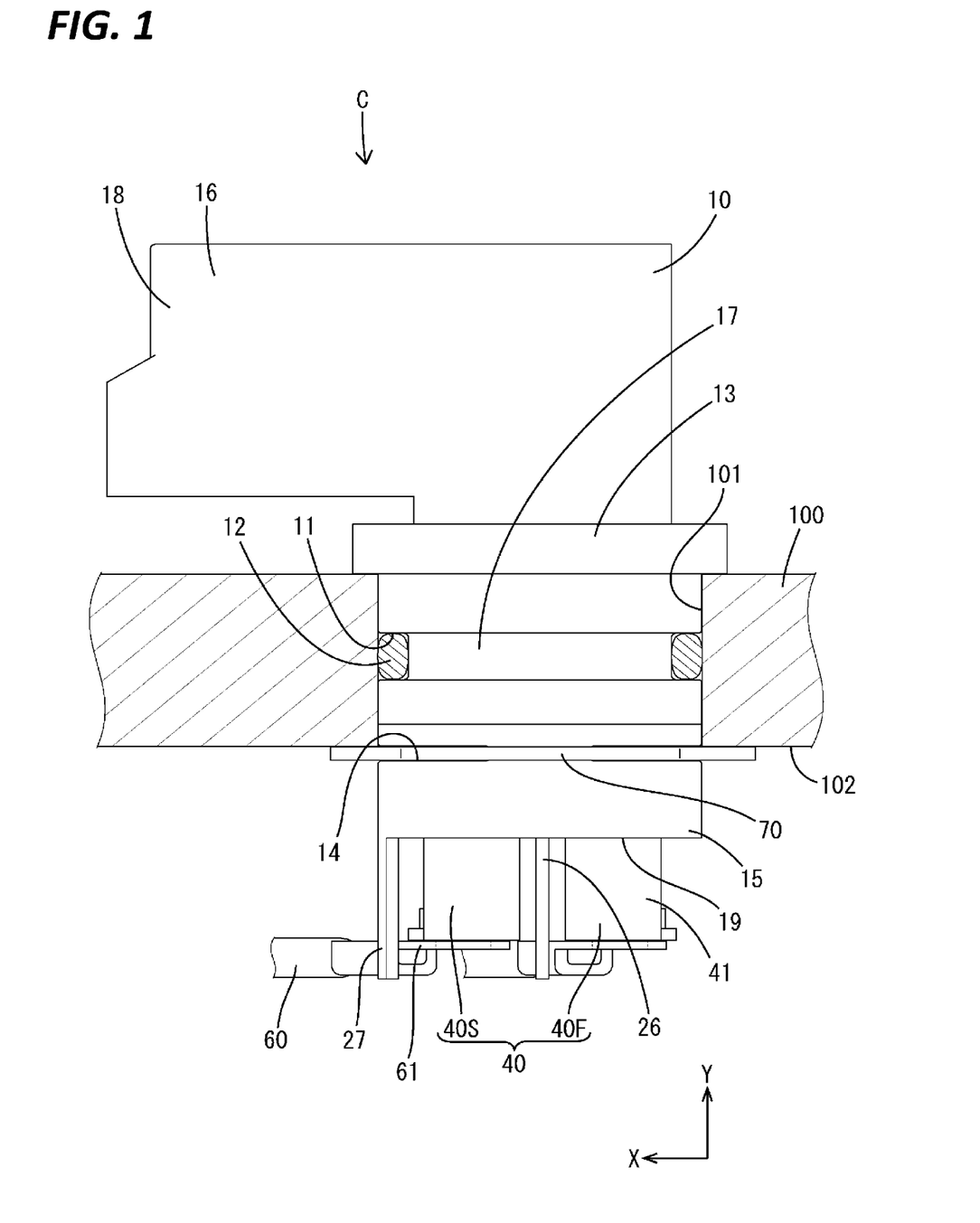
FIG. 1 is a side view of a connector according to an embodiment showing a state mounted on a case.

As shown in FIG. 1, a connector C is mounted on a lid of a case 100. The case 100 is a transmission case of a transmission of a vehicle or the like. The connector C relays and connects an unillustrated wiring harness arranged outside the case 100 and an unillustrated electrical component arranged inside the case 100. The connector C prevents the leakage of oil from the inside of the case 100 to the outside of the case 100. The connector C includes a receptacle 18 fittable to an unillustrated mating connector (see FIG. 2).

Figure 2:
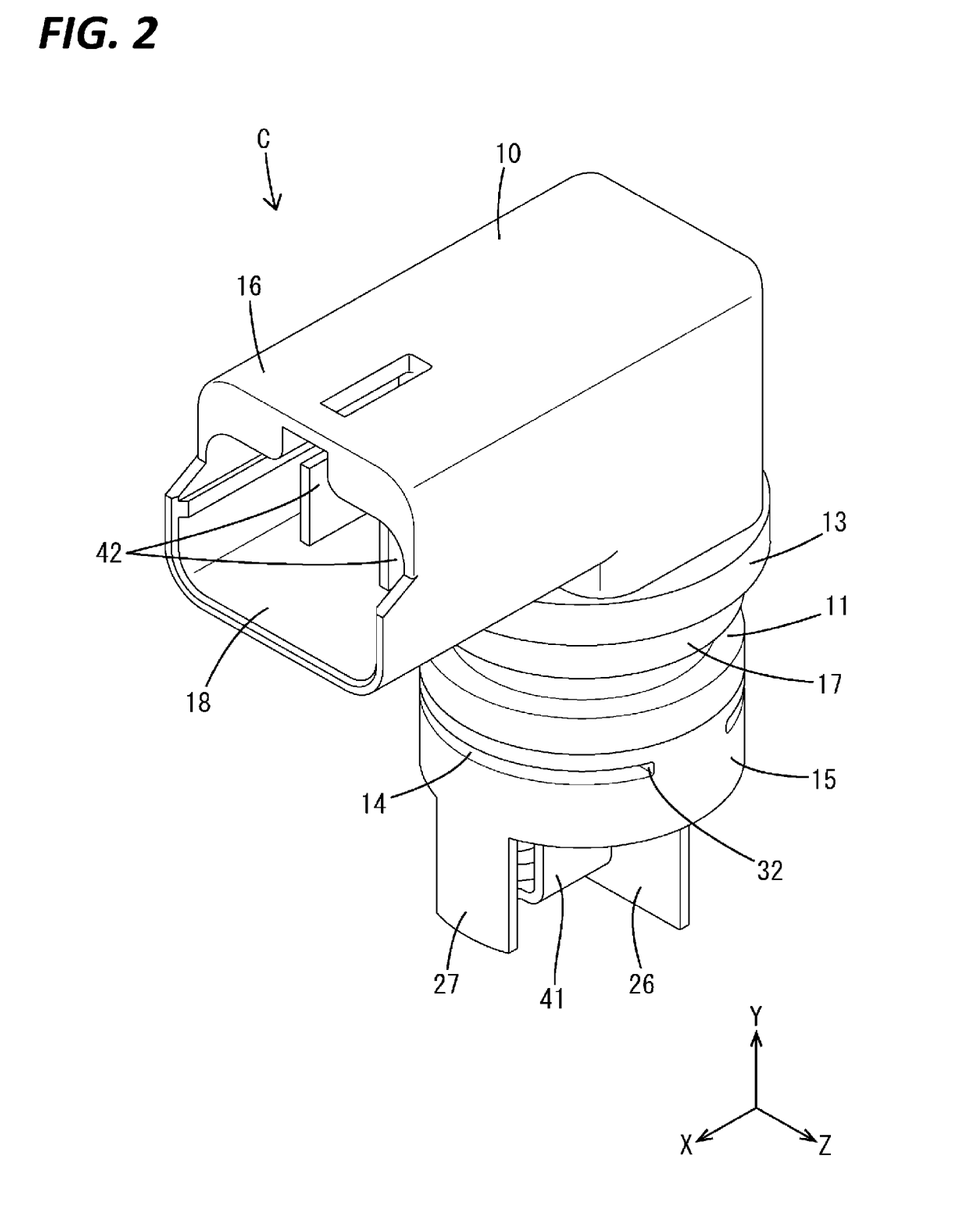
FIG. 2 is a perspective view showing the connector.

In FIG. 1, an X-axis direction is one direction along the outer surface of the case 100 and a connecting direction to the mating connector. A Y-axis direction is one direction orthogonal to the X-axis direction, and a penetration direction of the housing 10 through a mounting hole 101. In FIG. 2, a Z-axis direction is a direction orthogonal to X and Y axes. In the following description, a positive side of the X axis (side to be connected to the mating connector, side where the receptacle 18 is open) in FIG. 2 is referred to as a front side, a negative side of the X axis is referred to as a rear side, a positive side of the Y axis (outside of the case 100) is referred to as an upper side, a negative side of the Y axis (inside of the case 100) is referred to as a lower side, a positive side of the Z axis is referred to as a left side, and a negative side of the Z axis (side where inner harnesses 60 extend) is referred to as a right side. In this embodiment, "orthogonal" means not only a strictly orthogonal state, but also a substantially orthogonal state, e.g. a state where an angle between two directions is less than 90° and equal to or more than 85°.

As shown in FIGS. 1 and 2, the connector C is provided with a housing 10, terminal fittings 40 and the inner harnesses 60. Two terminal fittings 40 and two inner harness 60 are provided. The inner harness 60 is connected to the terminal fitting 40 inside the case 100.

The housing 10 is inserted into the mounting hole 101 of the case 100. The mounting hole 101 has a cylindrical shape and penetrates through the case 100 in an in-out direction. The housing 10 includes an inside arranged portion 15, an outside arranged portion 16 and an intermediate portion 17. The inside arranged portion 15 is arranged inside the case 100. The outside arranged portion 16 is arranged outside the case 100. The intermediate portion 17 is fit in the mounting hole 101.

The terminal fittings 40 are held in the housing 10. The terminal fittings 40 are busbars for large current (having an allowable current value of 60 amperes or more). The terminal fittings 40 are formed of copper or copper alloy. Each terminal fitting 40 includes an inner connecting portion 41, an outer connecting portion 42 and a linking portion 43 (see FIG. 3). The inner connecting portion 41 is arranged inside the case 100. The outer connecting portion 42 is arranged outside the case 100. The linking portion 43 links between the inner and outer connecting portions 41, 42. The inner and outer connecting portions 41, 42 are exposed to the outside of the housing 10. The linking portion 43 is embedded in the housing 10.

As shown in FIG. 1, the inside arranged portion 15 has an inner terminal holding surface 19, from which two inner connecting portions 41 project. The inner terminal holding surface 19 is arranged in parallel to an inner surface 102 of the case 100.

Figure 3:
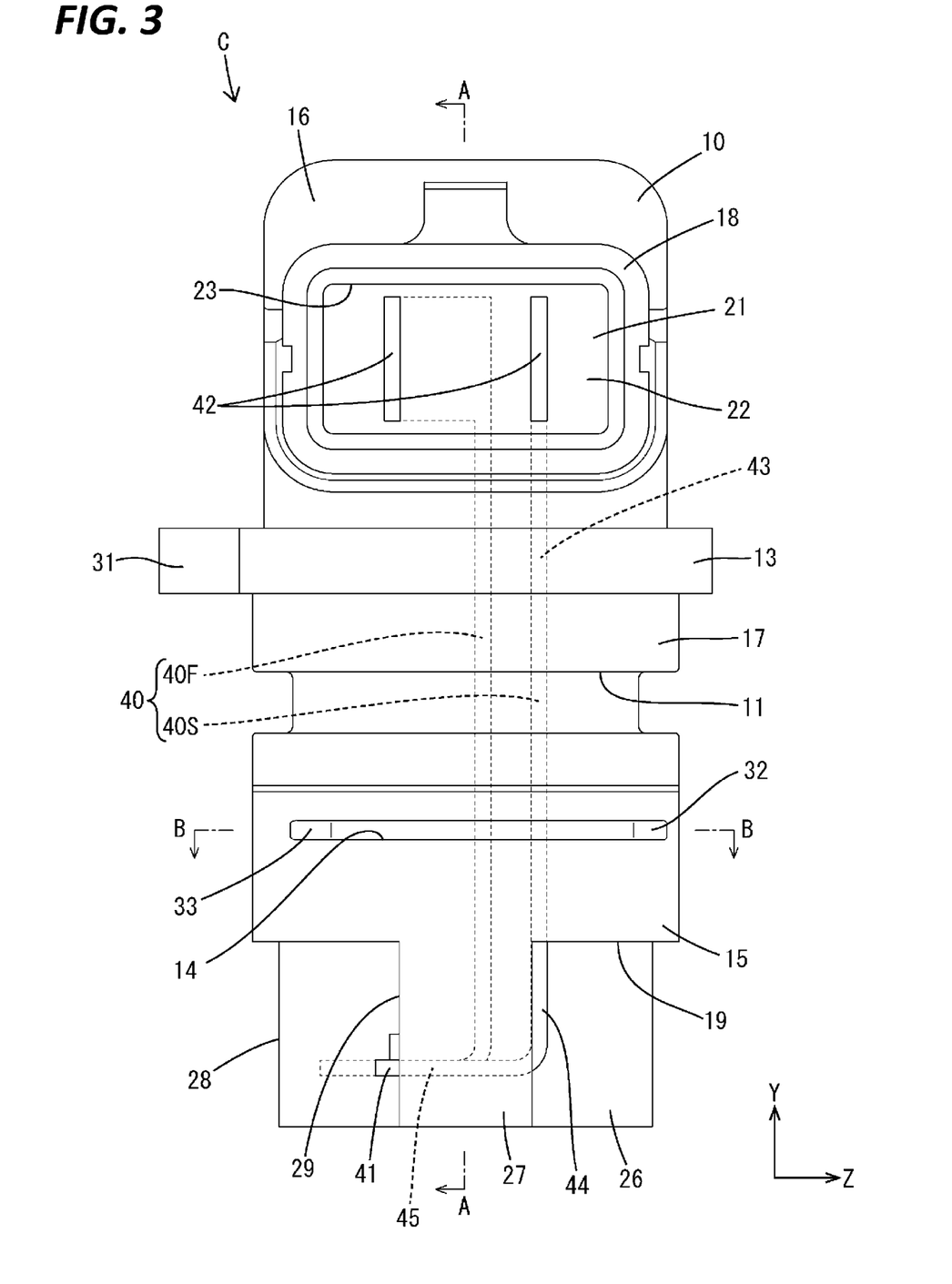
FIG. 3 is a front view showing the connector.
Figure 4:
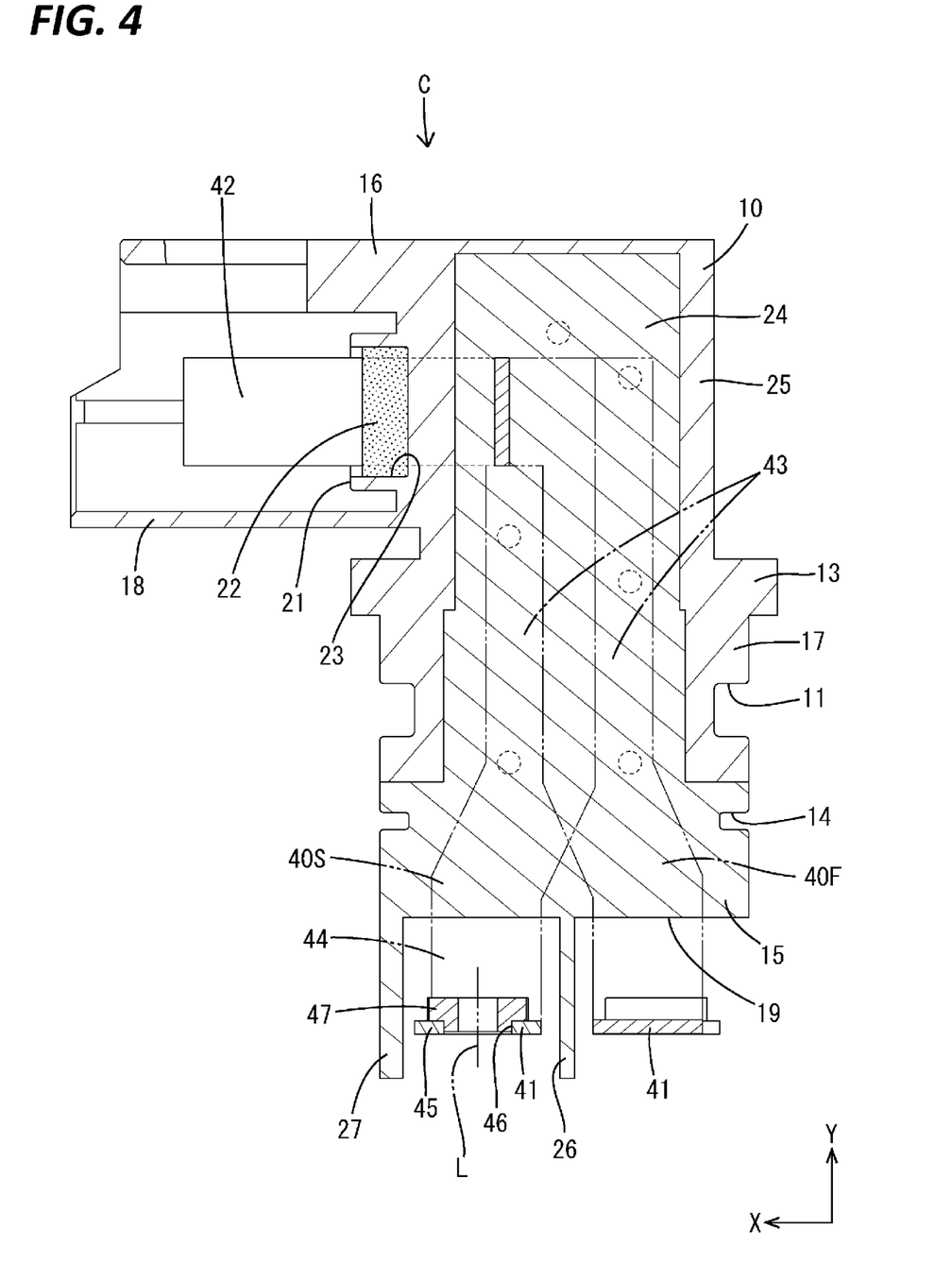
FIG. 4 is a section, corresponding to a cross-section along A-A of FIG. 3, showing the connector.

The outside arranged portion 16 includes the receptacle 18. As shown in FIG. 3, the receptacle 18 has a rectangular shape long in a lateral direction when viewed from front. The outside arranged portion 16 has an outer terminal holding surface 21, from which two outer connecting portions 42 project. The outer terminal holding surface 21 is the back surface of the receptacle 18. The outer terminal holding surface 21 is orthogonal to the inner terminal holding surface 19. A potting material 22 is arranged on the outer terminal holding surface 21. As shown in FIG. 4, the potting material 22 is filled in a recess 23 formed on the outer terminal holding surface 21. The potting material 22 covers the entire base ends of the two outer connecting portions 42. The potting material 22 seals a gap between each terminal fitting 40 and a resin forming the housing 10. Oil in the case 100 can be prevented from leaking to the outer terminal holding surface 21 of the housing 10 along a boundary between each terminal fitting 40 and the housing 10 by the potting material 22.

The outer peripheral surface of the intermediate portion 17 has a cylindrical shape. As shown in FIG. 1, an O-ring mounting groove 11 is formed in the intermediate portion 17. An O-ring 12 mounted in the O-ring mounting groove 11 is held in close contact with the inner peripheral surface of the mounting hole 101. The O-ring mounting groove 11 continuously extends over the entire periphery of the housing 10.

A flange 13 is provided on the lower end of the outside arranged portion 16 of the housing 10. The flange 13 projects from the outer peripheral surface of the housing 10. The flange 13 is locked to an outer side of a peripheral edge part of the mounting hole 101. A C-ring 70 mounted in a C-ring mounting groove 14 is locked to an inner side of the peripheral edge part of the mounting hole 101. The housing 10 is held on the case 100 by the flange 13 and the C-ring 70. The C-ring mounting groove 14 is described in detail later.

As shown in FIG. 4, the housing 10 includes a primary molding portion 24 and a secondary molding portion 25. The primary and secondary molding portions 24, 25 are obtained by injection-molding an insulating synthetic resin. The two terminal fittings 40 are insert-molded in the primary molding portion 24. The secondary molding portion 25 is molded on the outer periphery of the primary molding portion 24 using a resin. The secondary molding portion 25 includes the receptacle 18, the flange 13 and the O-ring mounting groove 11.

Figure 5:
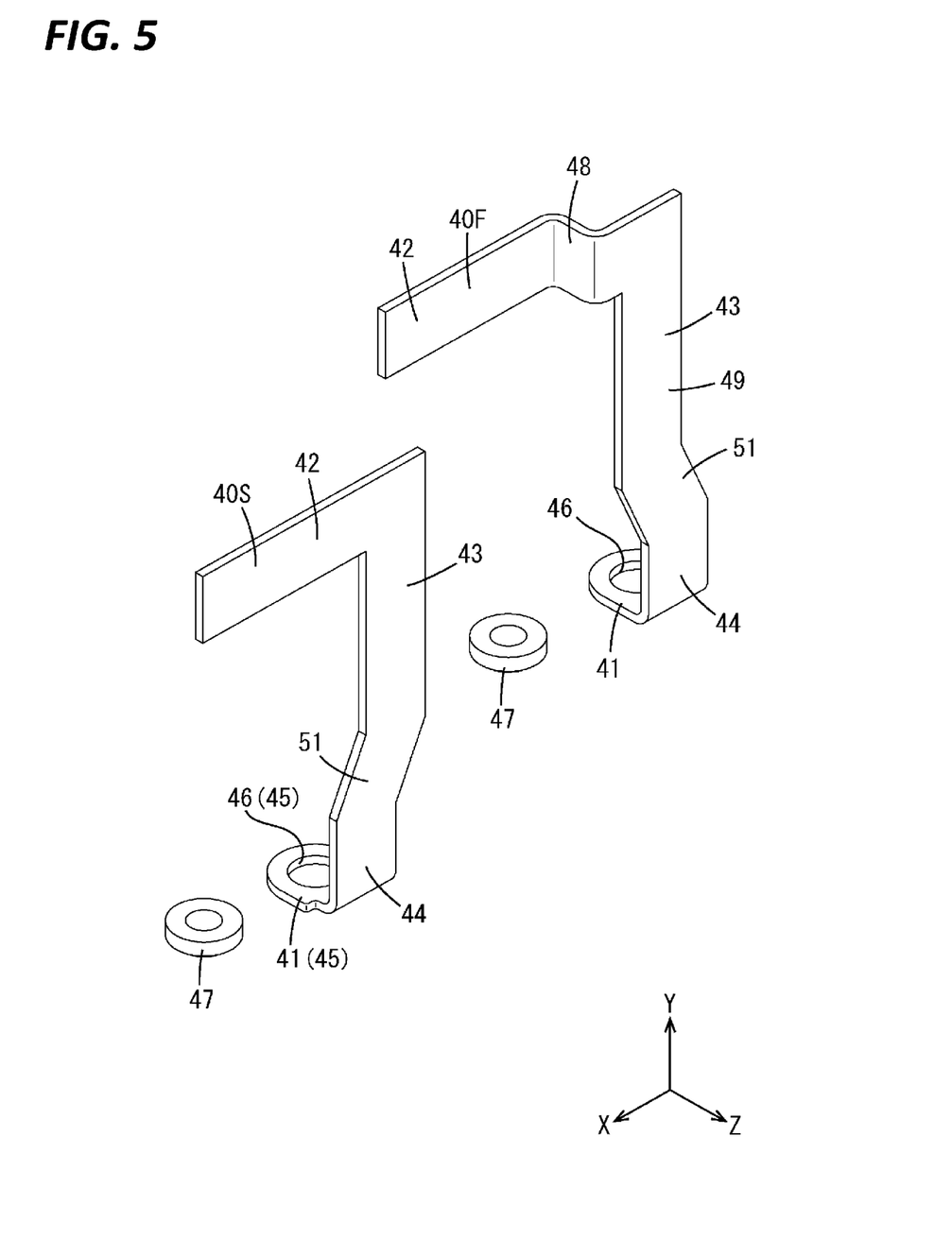
FIG. 5 is a perspective view showing terminal fittings.

As shown in FIG. 5, the terminal fittings 40 include a first terminal fitting 40F and a second terminal fitting 40S. The outer connecting portions 42 of the both terminal fittings 40F, 40S extend forward from upper end parts of the linking portions 43. The two outer connecting portions 42 are arranged at a predetermined interval in the lateral direction on the outer terminal holding surface 21 as shown in FIG. 3. Plate surfaces of the outer connecting portions 42 are facing both leftward and rightward. The plate surfaces of the outer connecting portion 42 of the first terminal fitting 40F and those of the outer connecting portion 42 of the second terminal fitting 40S are arranged in parallel. The positions of the outer connecting portion 42 of the first terminal fitting 40F and that of the second terminal fitting 40S are aligned in a vertical direction.

As shown in FIGS. 4 and 5, each of the inner connecting portions 41 of the both terminal fittings 40F, 40S includes an extending portion 44 and a nut placing portion 45. The extending portion 44 is hanging down from the inner terminal holding surface 19. The nut placing portion 45 is bent from the lower end of the extending portion 44. The extending portion 44 and the nut placing portion 45 are at a right angle to each other. Plate surfaces of the nut placing portion 45 are facing both upward and downward. The positions of the nut placing portion 45 of the first terminal fitting 40F and that of the second terminal fitting 40S are aligned in the vertical direction. The nut placing portion 45 includes a through hole 46.

The inner connecting portion 41 includes an unillustrated bolt and a press-fit nut 47 as a fastening member for fastening the inner harness 60. The bolt and the press-fit nut 47 are formed of iron, iron alloy or stainless steel. The press-fit nut 47 is hard to deform during fastening since having a high rigidity. The press-fit nut 47 has a smaller ionization tendency difference from the terminal fitting 40 as compared to the one formed of aluminum or aluminum alloy. Therefore, corrosion between dissimilar metals can be made less likely to occur. The press-fit nut 47 is press-fit into the through hole 46 of the nut placing portion 45. An axis L of the press-fit nut 47 fixed to the nut placing portion 45 extends in the vertical direction (penetration direction of the housing 10 through the mounting hole 101).

The linking portion 43 of the first terminal fitting 40F includes a bent portion 48 and a straight portion 49 as shown in FIG. 5. The bent portion 48 is bent leftward (in an arrangement direction of the outer connecting portions 42) from the rear end of the outer connecting portion 42. The left edge of the bent portion 48 is connected to the front edge of the straight portion 49. Plate surfaces of the bent portion 48 are facing both forward and rearward. Plate surfaces of the straight portion 49 are facing both leftward and rightward. The plate surfaces of the straight portion 49 and those of the outer connecting portion 42 are parallel. The straight portion 49 is arranged by being shifted to the left of the outer connecting portion 42. The linking portion 43 of the second terminal fitting 40S is arranged on the same plane as the outer connecting portion 42.

Each of the linking portions 43 of the first and second terminal fittings 40F, 40S includes an inclined portion 51. The inclined portion 51 is provided on a lower end part of the linking portion 43. The inclined portion 51 is embedded in the primary molding portion 24 (see FIG. 4). The inclined portion 51 of the first terminal fitting 40F and that of the second terminal fitting 40S are inclined in opposite directions. Specifically, the inclined portion 51 of the first terminal fitting 40F extends obliquely downward toward the rear. The inclined portion 51 of the second terminal fitting 40S extends obliquely downward toward the front. In this way, the two inner connecting portions 41 are arranged wider apart in the front-rear direction than the two linking portions 43. The inner connecting portion 41 of the first terminal fitting 40F is arranged behind that of the second terminal fitting 40S. The linking portion 43 of the first terminal fitting 40F and that of the second terminal fitting 40S are arranged at positions overlapping in the front-rear direction.

Figure 6:
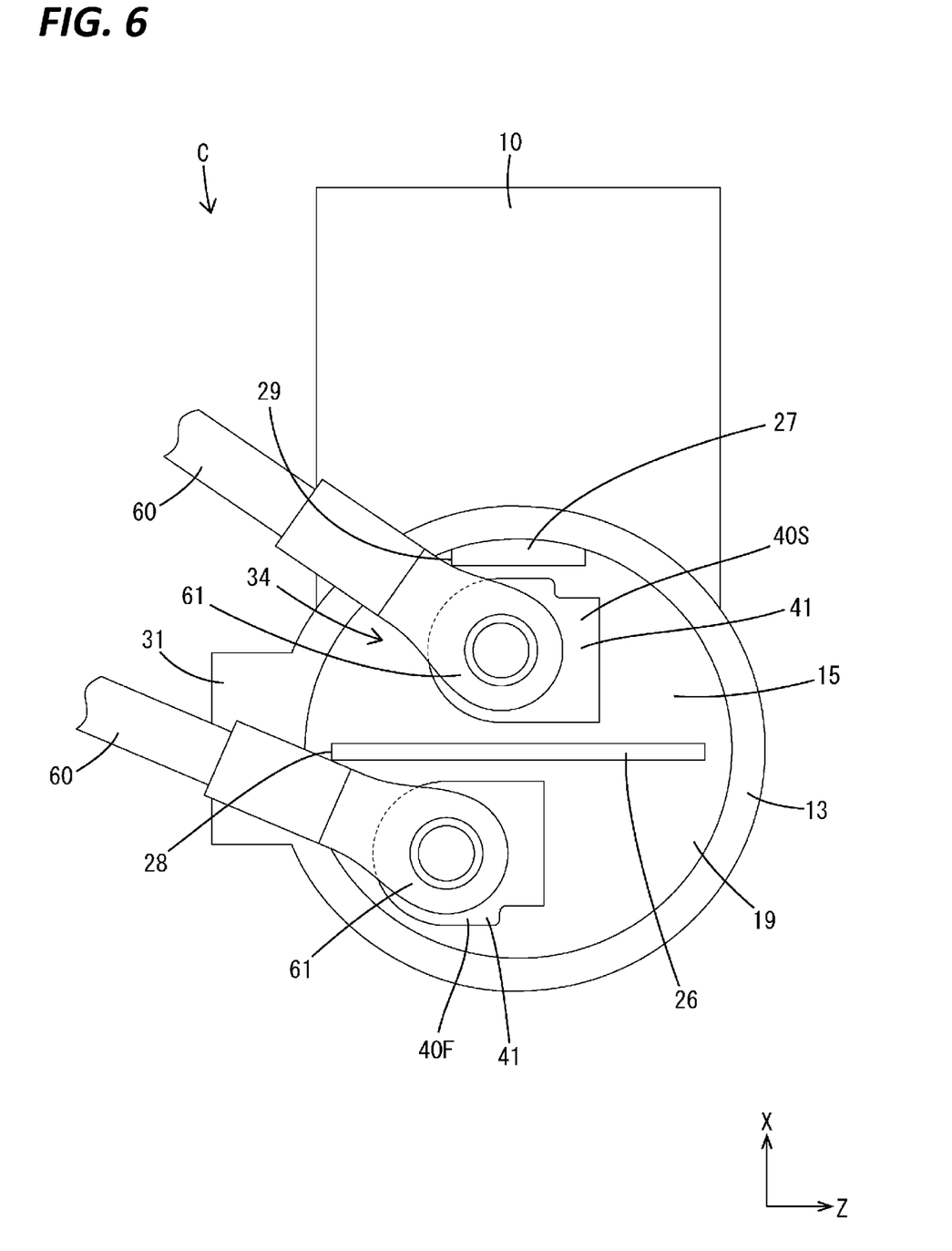
FIG. 6 is a bottom view showing the connector.

The inner connecting portion 41 of the second terminal fitting 40S is located in a central part in the lateral direction of the inner terminal holding surface 19 as shown in FIG. 6. The inner connecting portion 41 of the first terminal fitting 40F is located to the right of the inner connecting portion 41 of the second terminal fitting 40S.

The inner terminal holding surface 19 includes a first rib 26 and a second rib 27 as shown in FIG. 6. The first and second ribs 26, 27 project downward from the inner terminal holding surface 19 (see FIG. 4). Vertical dimensions of the first and second rib 26, 27 are equal. The lower ends of the first and second ribs 26, 27 are located below the lower surfaces of the nut placing portions 45.

The first rib 26 is provided in a central part in the front-rear direction of the inner terminal holding surface 19. The first rib 26 is arranged between the adjacent inner connecting portions 41. A creepage distance between the adjacent inner connecting portions 41 can be increased by the first rib 26. The first rib 26 is provided to divide the inner terminal holding surface 19 into two. The first rib 26 extends from the vicinity of the left end to the vicinity of the right end of the inner terminal holding surface 19. The first rib 26 is located on a tip side in a rotation direction (clockwise direction in FIG. 6) of the fastening member provided on the inner connecting portion 41 of the first terminal fitting 40F (one of the adjacent inner connecting portions 41). The rotation direction of the fastening member is a rotation direction of a bolt with respect to the press-fit nut during fastening.

The second rib 27 is provided on a peripheral edge part of the inner terminal holding surface 19. The first and second ribs 26, 27 are arranged at positions across one inner connecting portion 41. The second rib 27 is located in front of the inner connecting portion 41 of the second terminal fitting 40S. The front surface of the second rib 27 has an arcuate shape along the outer peripheral surface of the housing 10. The second rib 27 is located on a tip side in a rotation direction (clockwise direction in FIG. 6) of the fastening member provided on the inner connecting portion 41 of the second terminal fitting 40S (the other of the adjacent inner connecting portions 41).

As shown in FIG. 6, the right edge of the first rib 26 is a first contact surface 28 for the inner harness 60. The right edge of the second rib 27 is a second contact surface 29 for the inner harness 60. The first and second contact surfaces 28, 29 extend straight in the vertical direction (see FIG. 3). Crimping terminals 61 of the inner harnesses 60 contact the first and second contact surfaces 28, 29. The first contact surface 28 is located to the right of the second contact surface 29. The first contact surface 28 is located behind the second contact surface 29.

As shown in FIG. 6, a pull-out opening 34 for the inner harness 60 is formed between the first and second contact surfaces 28, 29. One inner harness 60 is pulled out from the pull-out opening 34. Extending directions of the inner harnesses 60 are determined by respectively bringing the two inner harnesses 60 into contact with the first and second contact surfaces 28, 29.

The inner harness 60 is such a coated wire that a core wire formed of electrically conductive metal is covered with an insulating resin. The inner harness 60 is a thick wire having a relatively large diameter. A cross-sectional area of the core wire of the inner harness 60 is 8 mm$^2$ (so-called 8 sq) or more. The crimping terminal 61 is connected to an end part of the inner harness 60. The crimping terminal 61 is a round terminal.

As shown in FIG. 6, the housing 10 is provided with an outer periphery projecting portion 31. The outer periphery projecting portion 31 is brought into contact with an unillustrated positioning portion provided on the case 100. In this way, the orientation of the connector C can be determined. The outer periphery projecting portion 31 is provided on the flange 13. The outer periphery projecting portion 31 projects rightward from a part of the outer peripheral surface of the flange 13. The outer periphery projecting portion 31 is provided on the same side as the first and second contact surfaces 28, 29. A projecting direction of the outer periphery projecting portion 31 is the same direction as projecting directions of the inner harnesses 60. Both front and rear surfaces of the outer periphery projecting portion 31 are parallel to both front and right surfaces of the first rib 26 and the rear surface of the second rib 27.

Figure 7:
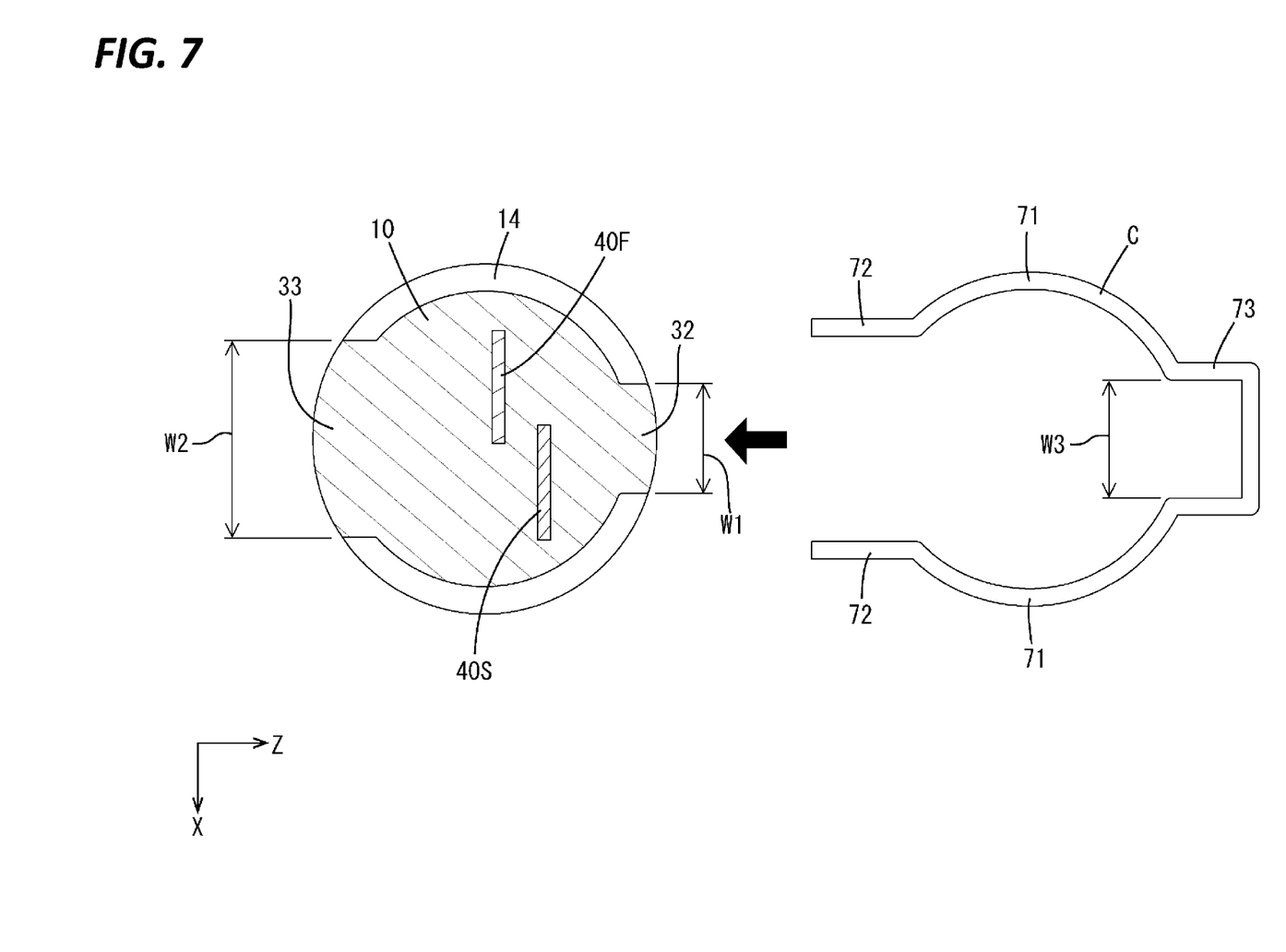
FIG. 7 is a section, corresponding to a cross-section along B-B of FIG. 3, showing a C-ring mounting groove.

As shown in FIG. 7, the C-ring mounting groove 14 includes a first protrusion 32 and a second protrusion 33. The first and second protrusions 32, 33 are formed by filling parts of the C-ring mounting groove 14 in a circumferential direction. The first and second protrusions 32, 33 are formed by being filled entirely in a depth direction of the C-ring mounting groove 14. The first and second protrusions 32, 33 divide the C-ring mounting groove 14. A width (dimension in the circumferential direction of the housing 10) W1 of the first protrusion 32 is smaller than a width W2 of the second protrusion 33. The first and second protrusions 32, 33 are arranged at opposite positions in the C-ring mounting groove 14. Specifically, the first protrusion 32 is provided on the left surface of the housing 10, and the second protrusion 33 is provided on the right surface of the housing 10 (see FIG. 3). The first protrusion 32 is provided on a side opposite to the first and second contact surfaces 28, 29.

The C-ring 70 is formed by bending a metal wire material into a substantially C shape. As shown in FIG. 7, the C-ring 70 includes arcuate portions 71, tip portions 72 and a fitting portion 73. The arcuate portions 71 are mounted along the C-ring mounting groove 14. The tip portions 72 extend radially outward from end parts of the arcuate portions 71. An interval between the tip portions 72 is larger than the width W2 of the second protrusion 33. The fitting portion 73 projects radially outward. The fitting portion 73 is fittable to the first protrusion 32. A width (dimension between end parts of the arcuate portions 71) W3 of an open part of the fitting portion 73 is smaller than the width W2 of the second protrusion 33. In this way, the C-ring 70 cannot be mounted into the C-ring mounting groove 14 from the side where the second protrusion 33 is provided (right side). Further, by providing the first and second protrusions 32, 33, the C-ring 70 cannot be mounted into the C-ring mounting groove 14 from front and behind. In other words, the C-ring 70 can be mounted into the C-ring mounting groove 14 only from the side where the first protrusion 32 is provided (left side).

Next, an example of an operation of mounting the connector C on the case 100 is described. At first, the housing 10 is inserted into the mounting hole 101 of the case 100. Specifically, the housing 10 is inserted into the mounting hole 101 with the inside arranged portion 15 in the lead. At this time, the second rib 27 is inserted along the peripheral surface of the mounting hole 101. The insertion of the housing 10 is guided by the second rib 27. Eventually, the lower surface of the flange 13 contacts the outer side of the case 100. In this way, the housing 10 is prevented from being separated to the inside of the case 100.

Subsequently, the C-ring 70 is mounted on the housing 10. The C-ring 70 is inserted into the C-ring mounting groove 14 from the side of the first protrusion 32. The tip portions 72 of the C-ring 70 enter the C-ring mounting groove 14 from both front and rear sides of the first protrusion 32 and arranged on both front and rear sides of the second protrusion 33. The arcuate portions 71 are mounted in the C-ring mounting groove 14. The fitting portion 73 is fit to the first protrusion 32. In this way, the C-ring 70 is mounted into the C-ring mounting groove 14. The tip portions 72 and the fitting portion 73 of the C-ring 70 project outward from the outer peripheral surface of the housing 10 and are locked to the inner surface 102 of the case 100. The housing 10 is held in a state fit in the mounting hole 101 by the flange 13 and the C-ring 70.

Here, if an attempt is made to insert the C-ring 70 into the C-ring mounting groove 14 from a side where the first protrusion 32 is not provided, the tip portions 72 of the C-ring 70 butt against the second protrusion 33 and the C-ring 70 can be inserted. Accordingly, the C-ring 70 is mounted into the C-ring mounting groove 14 only from the side of the first protrusion 32. In this way, the positions of the tip portions 72 of the C-ling 70 are determined to be positions on both front and rear sides of the second protrusion 33.

Subsequently, the inner harnesses 60 are connected to the inner connecting portions 41. Specifically, the crimping terminals 61 of the inner harnesses 60 are placed on the lower surfaces of the inner connecting portions 41 and the crimping terminals 61 and the inner connecting portions 41 are connected using the unillustrated bolts. The bolts are inserted from below into the crimping terminals 61 and the press-fit nuts 47 to fasten the crimping terminals 61 and the press-fit nuts 47. Since a work space is easily secured below the housing 10, the operation can be easily performed. In rotating the bolts, the crimping terminals 61 respectively contact the first and second contact surfaces 28, 29 and the rotation thereof is stopped. Accordingly, a bolt fastening operation can be easily performed. In this way, the two inner harnesses 60 are respectively connected to the first and second terminal fittings 40F, 40S. Since the inner harnesses 60 are connected after the housing 10 is fixed to the case 100, a degree of freedom in layout in the case 100 can be increased. In the above way, the operation of mounting the connector C on the case 100 is completed.

Next, functions and effects of the embodiment configured as described above are described. The connector C is mounted on the case 100. The connector C is provided with the housing 10, the terminal fittings 40, the inner harnesses 60 and the C-ring 70. The housing 10 is passed through the mounting hole 101 formed in the case 100. The outer peripheral surface of the housing 10 includes the flange 13 projecting toward an outer peripheral side and the C-ring mounting groove 14, into which the C-ring is mounted. The flange 13 and the C-ring 70 sandwich the peripheral edge part of the mounting hole 101, out of the case 100. The terminal fittings 40 are held in the housing 10. The terminal fitting 40 includes the inner connecting portion 41 and the outer connecting portion 42. The inner connecting portion 41 is connected to the inner harness 60. The outer connecting portion 42 projects outwardly of the case 100 from the housing 10. The potting material 22 is arranged on the outer terminal holding surface 21 of the housing 10, from which the outer connecting portions 42 project, to cover the outer terminal holding surface 21. The inner connecting portion 41 includes the press-fit nut 47 for connecting the inner harness 60. The axis L of the press-fit nut 47 extends in the penetration direction of the housing 10 through the mounting hole 101. The inner harness 60 is arranged to extend from the inner connecting portion 41 in a direction intersecting the penetration direction of the housing 10 through the mounting hole 101.

According to this configuration, since the housing 10 can be held in the mounting hole 101 by the flange 13 and the C-ring 70, the connector C can be mounted on the case 100 without bolt fastening. Further, the connector C can be reduced in size since a part to be fastened to the case 100 is not necessary.

The potting material 22 is arranged on the outer terminal holding surface 21 of the housing 10, from which the outer connecting portions 42 project. In this way, the oil in the case 100 can be prevented from leaking to the outside of the housing 10 along the boundary between each terminal fitting 40 and the housing 10.

Since the axis L of the press-fit nut 47 is the same direction as the penetration direction of the housing 10 through the mounting hole 101, a space for the fastening operation is easily secured.

Since the inner harness 60 extends from the inner connecting portion 41 in the direction intersecting the penetration direction of the housing 10 through the mounting hole 101, the connector C can be reduced in height as compared to the case where the inner harness 60 extends in the penetration direction of the housing 10 through the mounting hole 101. If a crimping terminal is arranged perpendicular to an inner terminal holding surface, an entire height of a connector including an inner harness tends to increase. However, since the crimping terminal 61 is arranged in parallel to the inner terminal holding surface 19, the connector C can be reduced in height. Further, if the inner harness extends in a direction perpendicular to the inner terminal holding surface, a bending radius tends to increase if an attempt is made to route the inner harness in the direction parallel to the inner terminal holding surface. However, since the inner harness 60 extends in the direction parallel to the inner terminal holding surface 19, a bending radius can be reduced and space efficiency in the case 100 can be improved.

The C-ring mounting groove 14 is formed to extend in the circumferential direction in the outer peripheral surface of the housing 10. The C-ring mounting groove 14 includes the first and second protrusions 32, 33 located at the opposite positions on the outer peripheral surface of the housing 10. The dimension in the circumferential direction of the first protrusion 32 is smaller than that of the second protrusion 33. The C-ring 70 includes the fitting portion 73 to be fit to the first protrusion 32 in a state mounted in the C-ring mounting groove 14. A dimension in the circumferential direction of the fitting portion 73 is smaller than that of the second protrusion 33. According to this configuration, the C-ring 70 can be mounted into the C-ring mounting groove 14 only in such an orientation that the fitting portion 72 is fit to the first protrusion 32. Therefore, the orientation of the C-ring 70 can be set.

The two inner harnesses 60 extend in the projecting directions of the tip portions 72 of the C-ring 70 and are arranged below the tip portions 72 of the C-ring 70. Since it can be made difficult for external matters and the like to contact the tip portions 72 of the C-ring 70 in this way, the C-ring 70 can be prevented from being inadvertently deformed in an opening direction and separated from the housing 10.

The inner terminal holding surface 19 of the housing 10, from which the two inner connecting portions 41 project, includes the first and second ribs 26, 27. The first rib 26 is provided between the adjacent inner connecting portions 41. The second rib 27 is provided at the position opposite to the first rib 26 with respect to one of the adjacent inner connecting portions 41. According to this configuration, a short circuit between the adjacent inner connecting portions 41 can be prevented by the first rib 26. The extending directions of the inner harnesses 60 can be limited by the first and second ribs 26, 27.

The first rib 26 is located on the tip side in the rotation direction of the bolt with respect to the press-fit nut 47 provided on the one of the adjacent inner connecting portions 41 during fastening. The second rib 27 is located on the tip side in the rotation direction of the bolt with respect to the press-fit nut 47 provided on the other of the adjacent inner connecting portions 41 during fastening. According to this configuration, the first rib 26 functions as a rotation stopper in fastening the inner harness 60 to the one inner connecting portion 41. The second rib 27 functions as a rotation stopper in fastening the inner harness 60 to the other inner connecting portion 41. Therefore, the operation of fastening the inner harnesses 60 to the inner connecting portions 41 can be easily performed.

The inner connecting portion 41 is formed with the through hole 46. The fastening member includes the press-fit nut 47 press-fit into the through hole 46. According to this configuration, the inner harness 60 can be connected to the inner connecting portion 41 by bolt-fastening the inner harness 60 to the press-fit nut 47.

The housing 10 includes the outer periphery projecting portion 31 projecting from the part in the circumferential direction of the outer peripheral surface. According to this configuration, the connector C can be fixed in a predetermined orientation to the case 100 by bringing the outer periphery projecting portion 31 into contact with the positioning portion provided on the case 100.

The terminal fitting 40 is a busbar including the inner connecting portion 41, the outer connecting portion 42 and the linking portion 43 between the inner and outer connecting portions 41, 42. According to this configuration, since the terminal fitting 40 can be embedded in the housing 10 by insert molding, the connector C can be easily manufactured.

The housing 10 includes the receptacle 18 arranged outside the case 100 and fittable to the mating connector. The outer terminal holding surface 21 is the back surface of the receptacle 18. The two outer connecting portions 42 are arranged at an interval on the outer terminal holding surface 21. The linking portion 43 includes the bent portion 48 bent in the arrangement direction of the outer connecting portions 42. According to this configuration, the two outer connecting portions 42 can be so arranged that the interval therebetween is aligned with an interval between terminal fittings of the mating connector, and an interval between the linking portions 43 can be made smaller than that between the outer connecting portions 42 inside the housing 10. Therefore, an outer diameter of the housing 10 can be reduced.

Other Embodiments

The embodiment disclosed this time should be considered illustrative in all aspects, rather than restrictive.

Although the inner terminal holding surface 19 includes the first and second ribs 26, 27 in the case of the above embodiment, a third rib may be provided in addition to first and second ribs as another embodiment. The number, arrangement, shapes and the like of the ribs can be changed as appropriate depending on the number of terminal fittings, the shapes of inner connecting portions and the like.

Although the C-ring mounting groove 14 includes the first and second protrusions 32, 33 in the case of the above embodiment, a C-ring mounting groove needs not necessarily be provided with first and second protrusions.

Although the connector C is provided with two terminal fittings 40F, 40S in the case of the above embodiment, a connector may be provided with one, three or more terminal fittings as another embodiment.

Although the first and second protrusions divide the C-ring mounting groove in the case of the above embodiment, first and second protrusions may be formed by filling parts of an inner peripheral side of a C-ring mounting groove and the C-ring mounting groove may extend on outer peripheral sides of the first and second protrusions as another embodiment.

LIST OF REFERENCE NUMERALS

C . . . connector
L . . . axis
W1 . . . width (circumferential dimension) of first protrusion
W2 . . . width (circumferential dimension) of second protrusion
W3 . . . width of open part of fitting portion 73
10 . . . housing
11 . . . O-ring mounting groove
12 . . . O-ring
13 . . . flange
14 . . . C-ring mounting groove
15 . . . inside arranged portion
16 . . . outside arranged portion
17 . . . intermediate portion
18 . . . receptacle
19 . . . inner terminal holding surface
21 . . . outer terminal holding surface
22 . . . potting material
23 . . . recess
24 . . . primary molding portion
25 . . . secondary molding portion
26 . . . first rib
27 . . . second rib
28 . . . first contact surface
29 . . . second contact surface
31 . . . outer periphery projecting portion
32 . . . first protrusion
33 . . . second protrusion
34 . . . pull-out opening
40 . . . terminal fitting
40F . . . first terminal fitting
40S . . . second terminal fitting
41 . . . inner connecting portion
42 . . . outer connecting portion
43 . . . linking portion
44 . . . extending portion
45 . . . nut placing portion
46 . . . through hole
47 . . . press-fit nut
48 . . . bent portion
49 . . . straight portion
51 . . . inclined portion
60 . . . inner harness
61 . . . crimping terminal
70 . . . C-ring
71 . . . arcuate portion 72 . . . tip portion
73 . . . fitting portion
100 . . . case
101 . . . mounting hole
102 . . . inner surface

What is claimed is:

1. A connector to be mounted on a case, comprising:
a housing to be passed through a mounting hole formed in the case;
a terminal fitting held in the housing;
an inner harness to be connected to the terminal fitting inside the case; and
a C-ring mounted on an outer peripheral surface of the housing,
the outer peripheral surface of the housing including a flange projecting toward an outer peripheral side and a C-ring mounting groove, the C-ring being mounted into the C-ring mounting groove,
the flange and the C-ring sandwiching a peripheral edge part of the mounting hole, out of the case,
the terminal fitting including an inner connecting portion to be connected to the inner harness and an outer connecting portion projecting outwardly of the case from the housing,
a potting material being arranged on an outer terminal holding surface of the housing to cover the outer terminal holding surface, the outer connecting portion projecting from the outer terminal holding surface,
the inner connecting portion including a fastening member for connecting the inner harness,
an axis of the fastening member extending in a penetration direction of the housing through the mounting hole, and
the inner harness being arranged to extend from the inner connecting portion in a direction intersecting the penetration direction.

2. The connector of claim 1, wherein:
the C-ring mounting groove is formed to extend in a circumferential direction in the outer peripheral surface of the housing and includes a first protrusion and a second protrusion at positions opposite to each other on the outer peripheral surface of the housing,
a dimension in the circumferential direction of the first protrusion is smaller than that of the second protrusion,
the C-ring includes a fitting portion to be fit to the first protrusion with the C-ring mounted in the C-ring mounting groove, and
a dimension in the circumferential direction of the fitting portion is smaller than that of the second protrusion.

3. The connector of claim 1, wherein:
an inner terminal holding surface of the housing, a plurality of the inner connecting portions projecting from the inner terminal holding surface, includes a first rib and a second rib,
the first rib is provided between the adjacent inner connecting portions, and
the second rib is provided at a position opposite to the first rib with respect to one of the adjacent inner connecting portions.

4. The connector of claim 3, wherein:
the first rib is located on a tip side in a rotation direction of the fastening member provided on the one of the adjacent inner connecting portions during fastening, and
the second rib is located on a tip side in a rotation direction of the fastening member provided on the other of the adjacent inner connecting portions during fastening.

5. The connector of claim 1, wherein:
the inner connecting portion is formed with a through hole, and
the fastening member includes a press-fit nut to be press-fit into the through hole and a bolt to be attached to the press-fit nut.

6. The connector of claim 1, wherein the housing includes an outer periphery projecting portion projecting from a part in a circumferential direction of the outer peripheral surface.

7. The connector of claim 1, wherein the terminal fitting is a busbar including the inner connecting portion, the outer connecting portion and a linking portion between the inner and outer connecting portions.

8. The connector of claim 7, wherein:
the housing includes a receptacle to be arranged outside the case and fittable to a mating connector,
the outer terminal holding surface is a back surface of the receptacle,
a plurality of the outer connecting portions are arranged at intervals on the outer terminal holding surface, and
the linking portion includes a bent portion bent in an arrangement direction of the outer connecting portions.

* * * * *